UNITED STATES PATENT OFFICE.

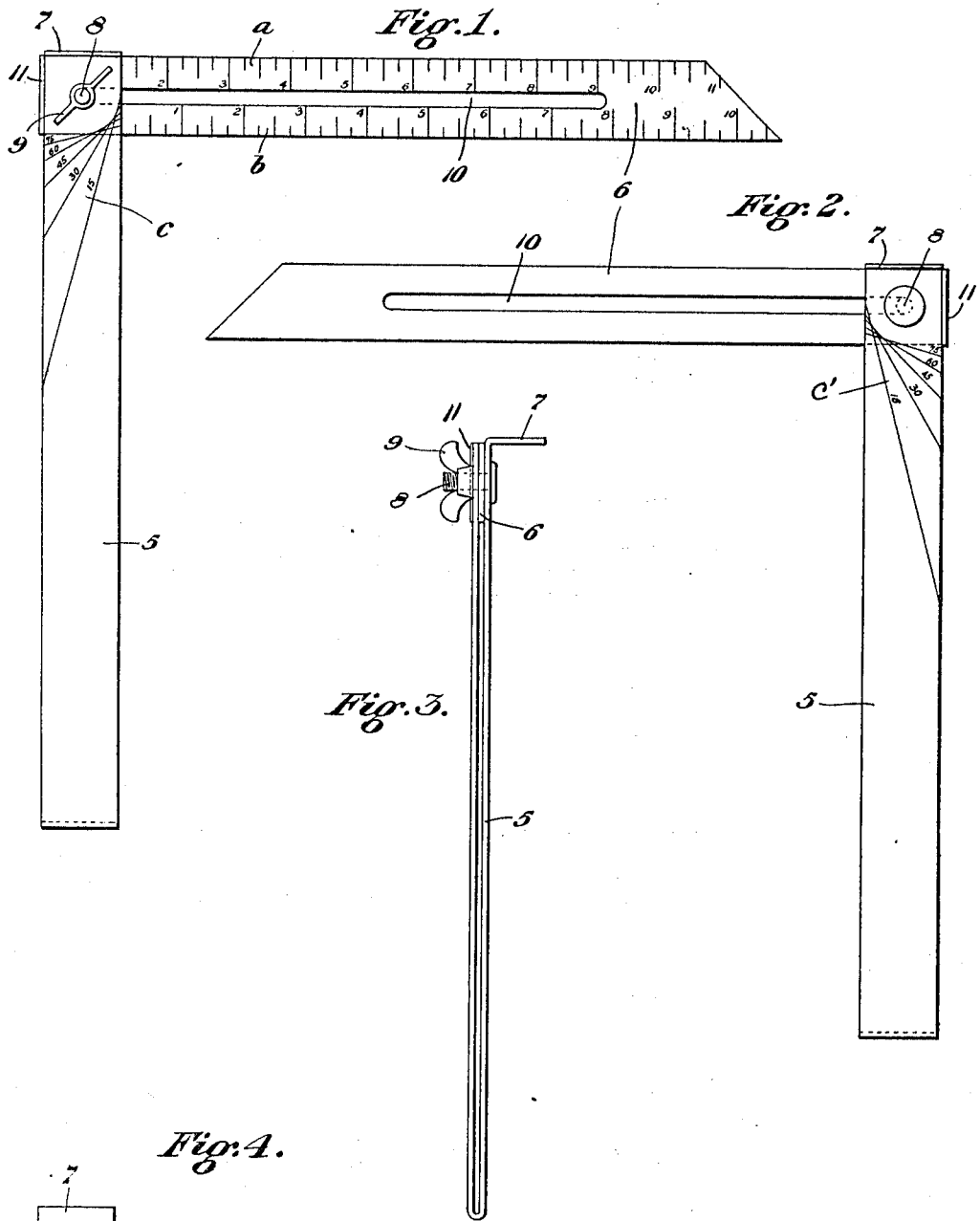

GEORGE F. CUNNINGHAM, OF KNOXVILLE BOROUGH, PENNSYLVANIA.

MECHANIC'S TOOL.

1,040,284.  Specification of Letters Patent.  Patented Oct. 8, 1912.

Application filed December 22, 1910. Serial No. 598,834.

*To all whom it may concern:*

Be it known that I, GEORGE F. CUNNINGHAM, a citizen of the United States, residing at Knoxville borough, in the State of Pennsylvania, have invented certain new and useful Improvements in Mechanics' Tools, of which the following is a specification.

My invention relates to mechanics' tools for measuring lines and angles, and its primary object is to enable the simultaneous measurement with one tool, of several dimensions, as for example, the width of a board, the distance of a certain line thereon from the end, and the angle of said line.

In the accompanying drawing, I have shown a form of the tool adapted to such use, Figure 1 being a plan view of the face; Fig. 2 an under plan; Fig. 3 a side view from the right of Fig. 1, and Fig. 4 a side view from the top of Fig. 1.

In the drawing, the reference figure 5 represents a handle made by bending a piece of plate as shown, and supporting a sliding blade 6 at the outer end in line with the inner surface of a depending lug or stop 7 on the handle. The member 6 is slotted as at 10, and is carried on a fixed pivot 8 attached to the handle and provided with threads and a thumb nut 9 to clamp the parts together. The square end of the blade 6 has also an upwardly extending lug or stop 11. When the stop 11 is in engagement with the member 5, as shown, the tool is a square. The blade 6 has a scale $a$ reading from the stop 11 and a scale $b$ reading from the opposite edge of the handle 5. When the blade is in alinement with the handle, it can be slid outwardly and the gage or width of the board or other object may be measured, the blade receding entirely into the handle. The blade may revolve around the pivot 8 at almost any point, and on the handle 5 I provide an angle scale $c$ by which the slant of a line with respect to the handle 5 may be measured with either edge of the blade 6.

It will be observed that in measuring a right angle the blade may be placed upon either side of the article, the object abutting against the handle 5. The scale $c$ is placed on both sides of the handle, and an angle may be measured upon either side of the object. Of course the 90° line of the scale $c$, as well as alinement with the stop 7, will enable the blade to be extended to either side laterally of the handle.

It will be apparent that advantages are found in this tool, in the ability to measure both the angle and the length of a slanting line, or the distance from the end of an object, or to rule a line at a measured distance parallel or perpendicular to a given line. The device, consisting essentially of but two main parts is extremely simple, and by reason of the adjustment stops is easy of arrangement, and is strong and cheap of construction. Other advantages will readily occur to those familiar with such devices.

Having thus described my invention and illustrated its use, what I claim is:

1. A mechanic's tool comprising a split handle, a slotted blade pivotally and extensibly mounted therein, a stop across the end of the blade adapted to engage the handle or the object to be measured and a scale on the blade, said handle having an end stop, whereby the tool has a scale and measuring gage both when it is alined with the handle and when it is at right angles with the handle.

2. A mechanic's tool comprising a split handle and a scaled, slotted, blade pivotally and extensibly mounted in said handle, both the handle and the blade being provided with end gage stops, whereby to measure by the stops when the blade is either in line with or at right angles to the handle.

3. A mechanic's tool comprising a split handle having a stop across the end thereof, a sliding blade pivotally mounted in said handle, and having an end stop thereon and one scale reading from said stop and another scale reading from the edge of the handle when the blade is at right angles to the handle, substantially as and for the purpose described.

4. A mechanic's tool comprising two pivoted members, one of which is slotted and pivoted and capable of being clamped on the other, said slotted member having two scales, reading respectively from the two sides of the other member, and the second or supporting member adapted to entirely contain the slotted member and having an angle scale thereon, whereby to simultaneously measure an angle, and the length of one of its sides.

In testimony whereof I have hereunto signed my name in the presence of the two subscribed witnesses.

GEORGE F. $\overset{\text{his}}{\times}$ CUNNINGHAM.
<center>mark</center>

Witnesses:
G. H. WILLOCK,
CHAS. M. CUNNINGHAM.

Copies of this patent may be obtained for five cents each, by addressing the "Commissioner of Patents, Washington, D. C."